US012523173B2

(12) United States Patent
Snyder et al.

(10) Patent No.: US 12,523,173 B2
(45) Date of Patent: Jan. 13, 2026

(54) SUPERCHARGED COMBUSTOR COOLING USING TURBOMACHINERY

(71) Applicant: RTX Corporation, Farmington, CT (US)

(72) Inventors: Timothy Snyder, Glastonbury, CT (US); Lawrence Binek, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/201,178

(22) Filed: May 7, 2025

(65) Prior Publication Data

US 2025/0347249 A1    Nov. 13, 2025

Related U.S. Application Data

(60) Provisional application No. 63/645,530, filed on May 10, 2024.

(51) Int. Cl.
*F02C 7/12* (2006.01)
*F01D 1/38* (2006.01)
(Continued)

(52) U.S. Cl.
CPC ............... *F02C 7/12* (2013.01); *F01D 1/38* (2013.01); *F01D 9/065* (2013.01); *F01D 25/12* (2013.01);
(Continued)

(58) Field of Classification Search
CPC . F01D 1/38; F01D 9/065; F01D 25/12; F02C 7/12; F02C 7/125; F02C 7/18;
(Continued)

(56) References Cited

U.S. PATENT DOCUMENTS

| 2,609,663 A | 9/1952 | Newcomb |
| 2,823,519 A | 2/1958 | Spalding |

(Continued)

FOREIGN PATENT DOCUMENTS

| CN | 101506474 B | 7/2012 |
| CN | 107725190 B | 10/2019 |

(Continued)

OTHER PUBLICATIONS

Extended European Search Report dated Sep. 19, 2025, for corresponding European Patent Application No. 25175857.9-1002, 8 pgs.

(Continued)

*Primary Examiner* — Kyle Robert Thomas
(74) *Attorney, Agent, or Firm* — Kinney & Lange, P.A.

(57) ABSTRACT

A gas turbine engine includes a compressor configured to receive inlet air at a compressor inlet and generate compressed air at a compressor exit, a combustor positioned fluidically and physically downstream of the compressor, a turbine positioned fluidically and physically downstream of the combustor, and a shaft mechanically connecting the turbine and the compressor. The combustor is fluidically connected to the compressor to receive a first portion of the compressed air as combustor primary inlet air. The combustor includes a combustor liner having an inner combustor liner and an outer combustor liner, surrounding one or more combustion zones. A cooling air flow path is configured to direct a second portion of the compressed air around the outer combustor liner to cool the combustor liner and to provide a source of quench air, inner combustor liner cooling air, fuel injector air, and combustor secondary inlet air.

20 Claims, 11 Drawing Sheets

(51) Int. Cl.
*F01D 9/06* (2006.01)
*F01D 25/12* (2006.01)
*F02C 7/18* (2006.01)
*F02C 7/32* (2006.01)
*F23R 3/04* (2006.01)
*F23R 3/26* (2006.01)
*F23R 3/54* (2006.01)

(52) U.S. Cl.
CPC ............... *F02C 7/125* (2013.01); *F02C 7/18* (2013.01); *F02C 7/32* (2013.01); *F23R 3/04* (2013.01); *F23R 3/26* (2013.01); *F23R 3/54* (2013.01); *F05D 2240/35* (2013.01); *F05D 2260/20* (2013.01); *F05D 2260/205* (2013.01); *F05D 2260/232* (2013.01); *F23R 2900/03041* (2013.01); *F23R 2900/03042* (2013.01); *F23R 2900/03043* (2013.01); *F23R 2900/03044* (2013.01)

(58) Field of Classification Search
CPC ...... F02C 7/32; F23R 3/04; F23R 3/26; F23R 3/54; F23R 2900/03041; F23R 2900/03042; F23R 2900/03043; F23R 2900/03044; F05D 2240/35; F05D 2260/20; F05D 2260/205; F05D 2260/232
See application file for complete search history.

(56) References Cited

U.S. PATENT DOCUMENTS

| | | |
|---|---|---|
| 3,034,298 A | 5/1962 | White |
| 3,099,134 A | 7/1963 | Henry et al. |
| 3,407,596 A | 10/1968 | Dasbach et al. |
| 3,618,777 A | 11/1971 | Meyer |
| 3,734,639 A | 5/1973 | Short |
| 4,007,002 A | 2/1977 | Schirmer |
| 4,040,251 A | 8/1977 | Heitmann et al. |
| 4,232,526 A | 11/1980 | Barbeau |
| 4,265,615 A | 5/1981 | Lohmann et al. |
| 4,301,656 A | 11/1981 | Stettler |
| 4,373,325 A | 2/1983 | Shekleton |
| 4,845,940 A | 7/1989 | Beer |
| 4,928,479 A | 5/1990 | Shekleton et al. |
| 4,996,838 A | 3/1991 | Melconian |
| 5,025,622 A | 6/1991 | Melconian |
| 5,069,033 A | 12/1991 | Shekleton |
| 5,163,285 A * | 11/1992 | Mazeaud ............... F02C 7/185 60/806 |
| 5,209,066 A | 5/1993 | Barbier et al. |
| 5,303,543 A | 4/1994 | Shah et al. |
| 5,727,378 A | 3/1998 | Seymour |
| 5,899,058 A | 5/1999 | Narcus et al. |
| 6,065,282 A * | 5/2000 | Fukue ............... F02C 7/185 415/117 |
| 6,148,617 A | 11/2000 | Williams |
| 6,250,061 B1 * | 6/2001 | Orlando ............... F02C 3/13 60/772 |
| 6,408,629 B1 | 6/2002 | Harris et al. |
| 6,931,862 B2 | 8/2005 | Harris |
| 7,303,372 B2 * | 12/2007 | West ............... F01D 11/001 415/176 |
| 7,568,343 B2 | 8/2009 | Harris et al. |
| 7,685,822 B1 | 3/2010 | Harris |
| 7,937,946 B1 | 5/2011 | Harris et al. |
| 8,479,492 B2 | 7/2013 | Patel et al. |
| 9,400,110 B2 | 7/2016 | Dudebout et al. |
| 9,528,705 B2 | 12/2016 | Melton |
| 9,631,814 B1 | 4/2017 | Barton et al. |
| 10,807,163 B2 | 10/2020 | Ott et al. |
| 10,808,934 B2 | 10/2020 | Boardman et al. |
| 10,823,422 B2 | 11/2020 | Johnson et al. |
| 10,907,834 B2 | 2/2021 | Park |
| 10,976,052 B2 | 4/2021 | Boardman et al. |
| 10,976,053 B2 | 4/2021 | Boardman et al. |
| 11,181,269 B2 | 11/2021 | Boardman et al. |
| 11,828,469 B2 | 11/2023 | Overman et al. |
| 12,298,009 B1 | 5/2025 | Yu et al. |
| 2007/0234733 A1 | 10/2007 | Harris et al. |
| 2009/0241506 A1 | 10/2009 | Nilsson |
| 2010/0205972 A1 | 8/2010 | Chila et al. |
| 2012/0034647 A1 | 2/2012 | Herzog et al. |
| 2012/0304647 A1 | 12/2012 | Dudebout et al. |
| 2014/0193274 A1 | 7/2014 | Thompson et al. |
| 2014/0366542 A1 | 12/2014 | Teets |
| 2016/0040885 A1 | 2/2016 | Gao et al. |
| 2019/0162188 A1 | 5/2019 | Sung |
| 2021/0199300 A1 | 7/2021 | Berry |
| 2021/0252596 A1 | 8/2021 | Sale et al. |
| 2022/0290861 A1 | 9/2022 | Chiranthan et al. |
| 2024/0151150 A1 | 5/2024 | Beck et al. |
| 2024/0401807 A1 | 12/2024 | Nath et al. |

FOREIGN PATENT DOCUMENTS

| | | |
|---|---|---|
| EP | 0529310 A1 | 3/1993 |
| JP | 2014169828 A | 9/2014 |
| JP | 6025616 B2 | 10/2016 |

OTHER PUBLICATIONS

Extended European Search Report dated Sep. 19, 2025, for corresponding European Patent Application No. 25175862.9-1002, 10 pgs.
Extended European Search Report for European Patent Application No. 25175723.3, dated Aug. 11, 2025, 9 pages.
Non-Final Office Action dated Aug. 11, 2025, for corresponding U.S. Appl. No. 19/201,188, 36 pgs.
Non-Final Office Action dated Sep. 16, 2025, for corresponding U.S. Appl. No. 19/201,164, 59 pgs.
Notice of Allowance and Fee(s) Due dated Oct. 17, 2025, for corresponding U.S. Appl. No. 19/201,178, 18 pgs.

* cited by examiner

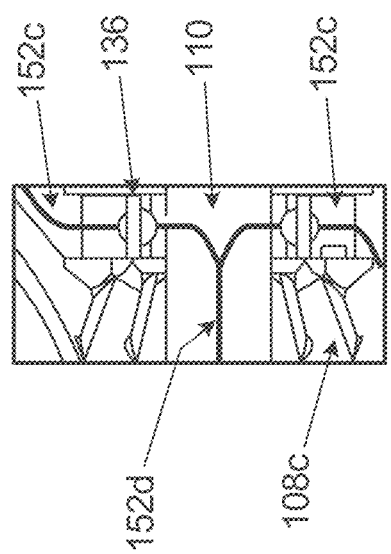
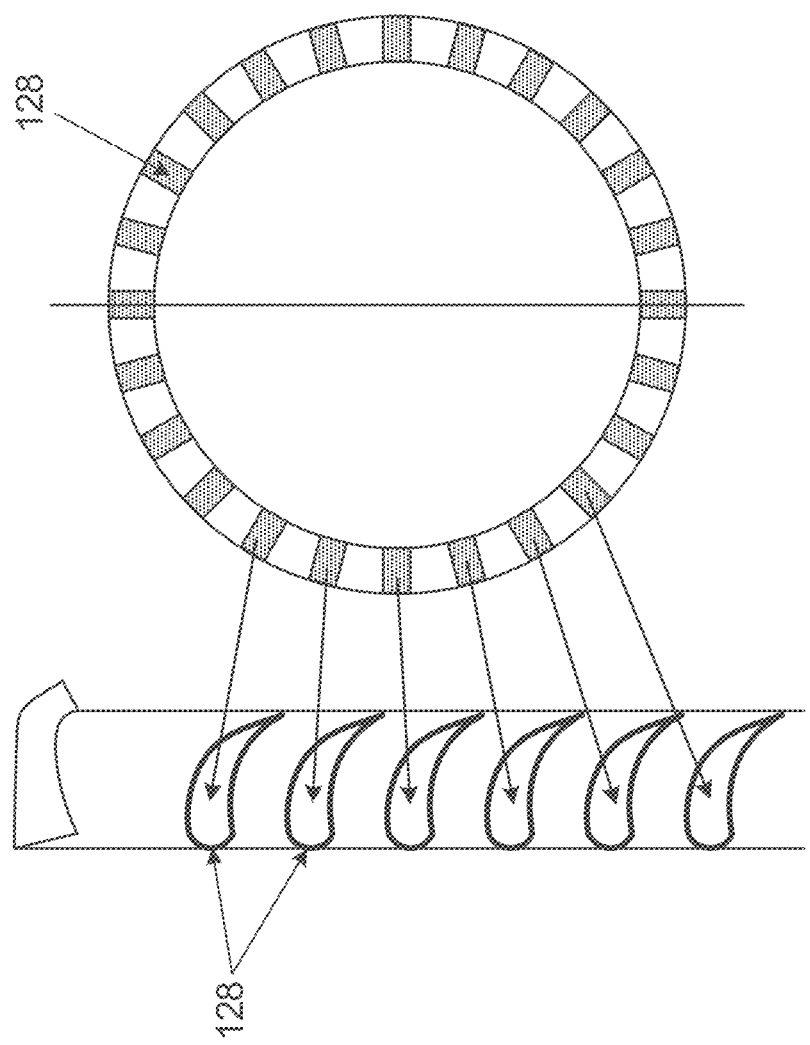
Fig. 4
Fig. 3B
Fig. 3A

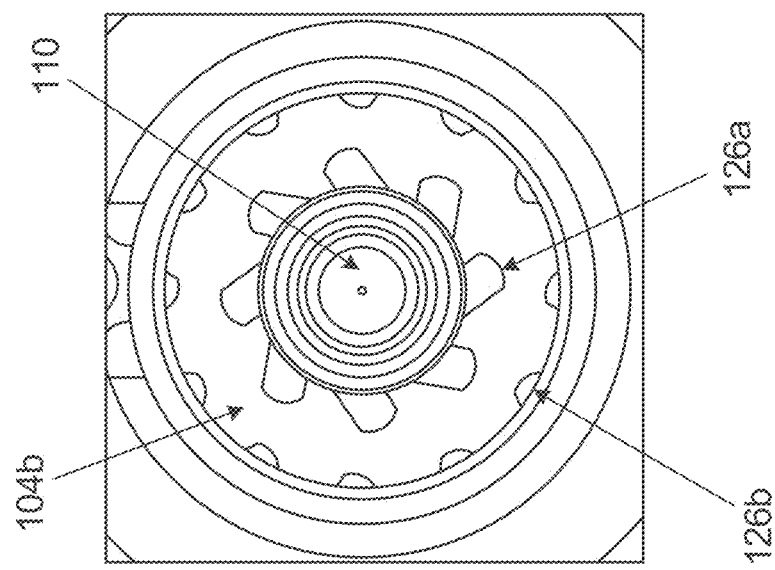
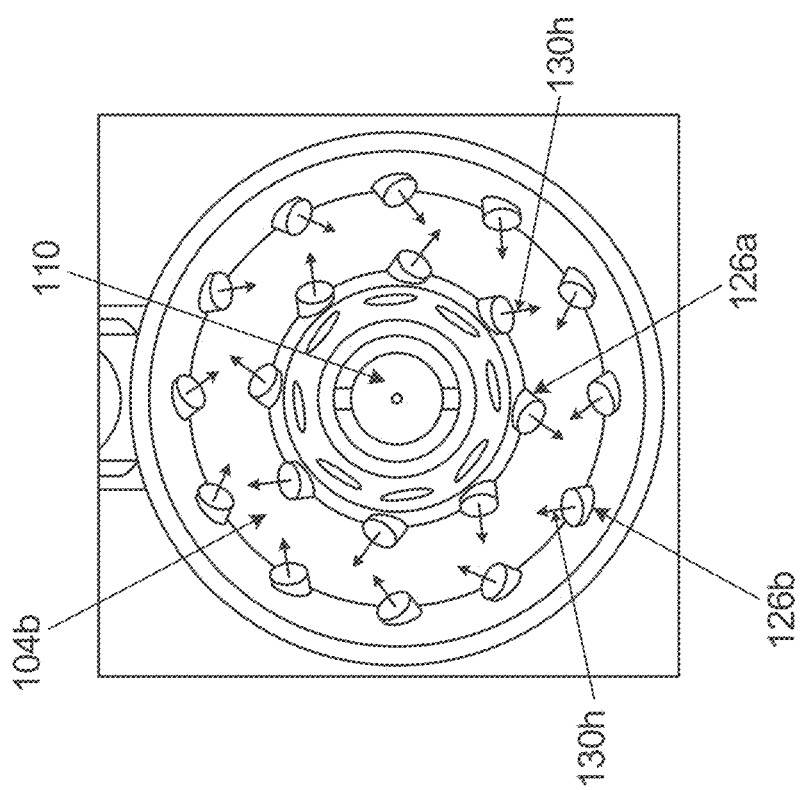
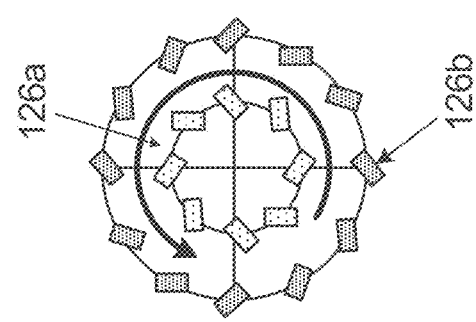

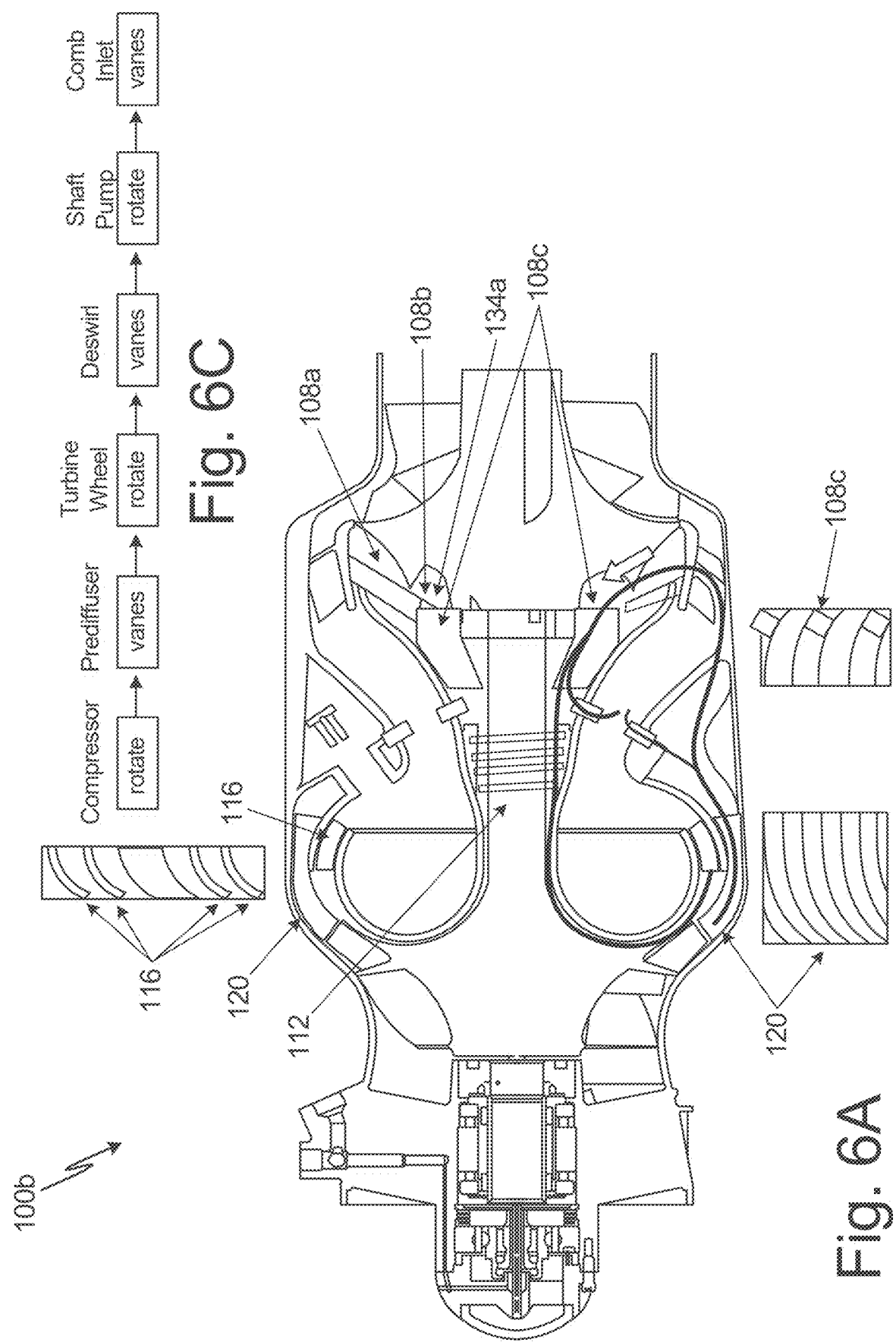

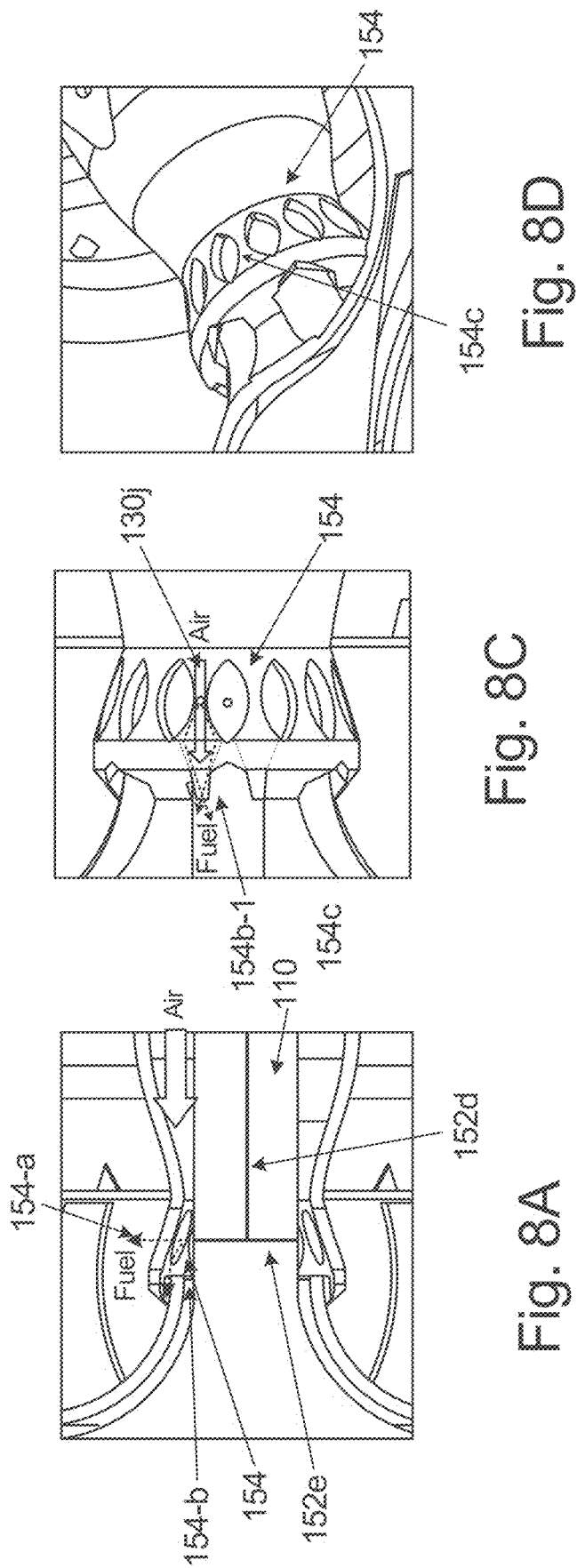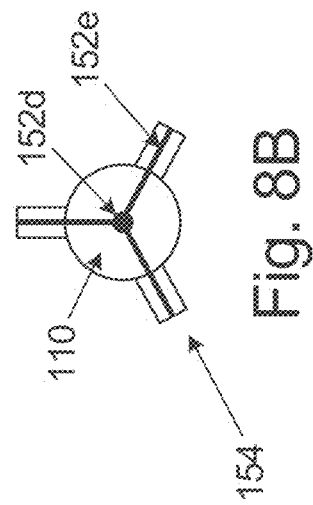

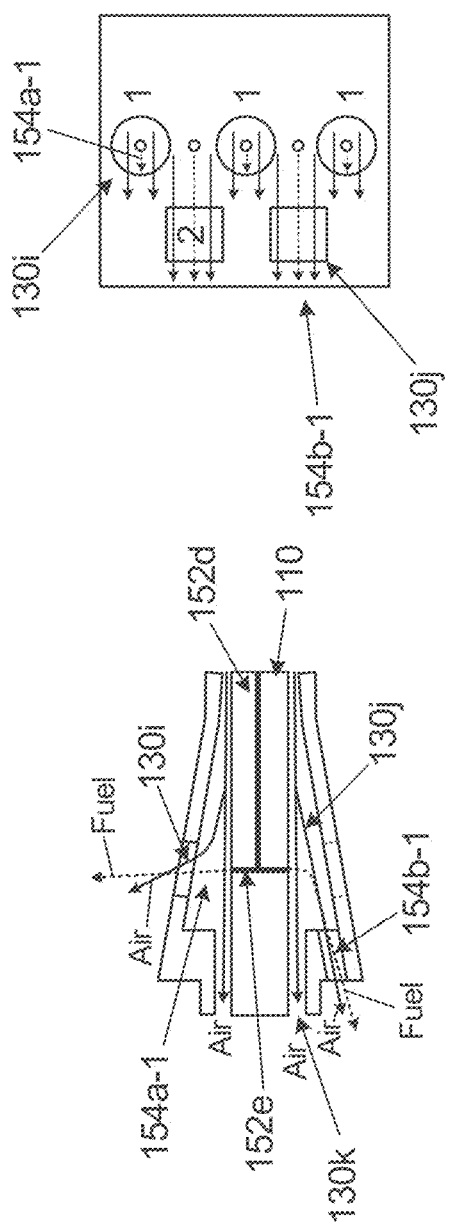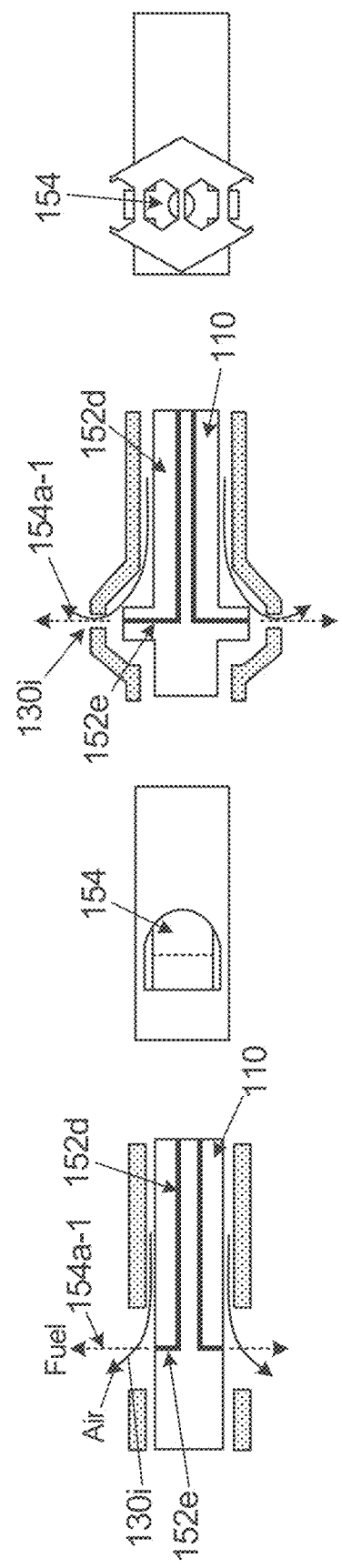
Fig. 9A  Fig. 9B  Fig. 9C  Fig. 9D  Fig. 9E  Fig. 9F

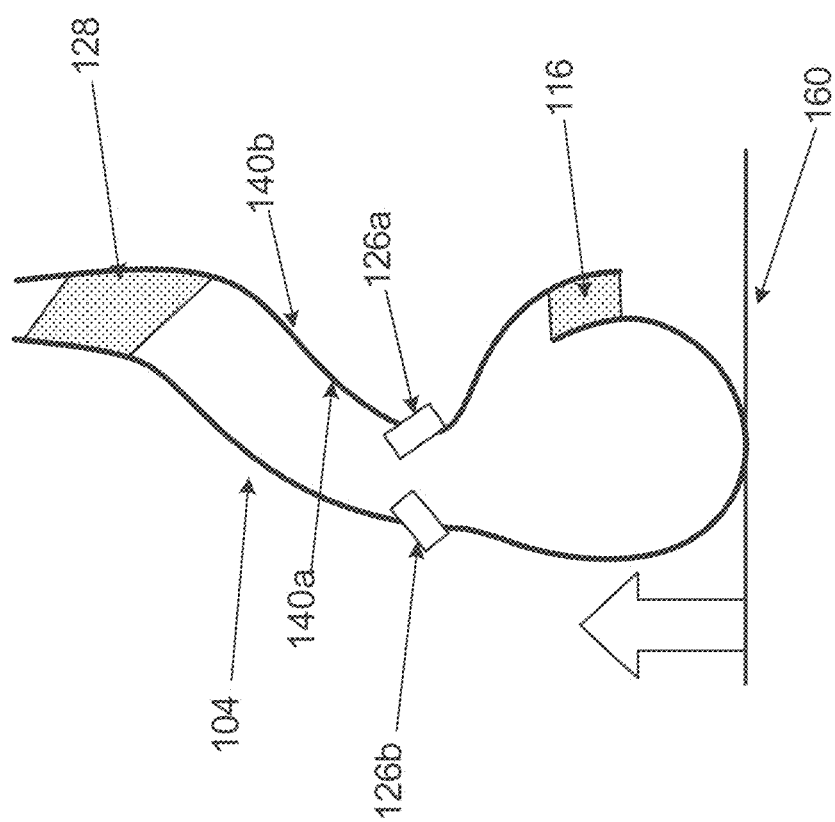

SUPERCHARGED COMBUSTOR COOLING USING TURBOMACHINERY

CROSS-REFERENCE TO RELATED APPLICATION(S)

This application claims the benefit of U.S. Provisional Application No. 63/645,530, filed May 10, 2024, and entitled "SUPERCHARGED COMBUSTOR COOLING USING TURBOMACHINERY," the disclosure of which is hereby incorporated by reference in its entirety.

The present disclosure relates generally to a gas turbine engine combustor and, more particularly, a gas turbine engine combustor with integral features that are suitable for construction using additive manufacturing processes.

For certain small gas turbine engines, it is desirable to improve designs to provide lower cost, smaller size, high altitude relight capability, improved operability and lean blow out (i.e., flame stability) characteristics, and enhanced operational life. In addition, thoughtful design can ensure that key portions of such gas turbine engines can be made using additive manufacturing processes.

SUMMARY

One aspect of this disclosure is directed to a gas turbine engine including a compressor configured to receive inlet air at a compressor inlet and generate compressed air at a compressor exit, a combustor positioned fluidically and physically downstream of the compressor, a turbine positioned fluidically and physically downstream of the combustor, and a shaft mechanically connecting the turbine and the compressor. The combustor is fluidically connected to the compressor to receive a first portion of the compressed air as combustor primary inlet air. The combustor includes a combustor liner having an inner combustor liner and an outer combustor liner, surrounding one or more combustion zones. A cooling air flow path is configured to direct a second portion of the compressed air around the outer combustor liner to cool the combustor liner and to provide a source of quench air, inner combustor liner cooling air, fuel injector air, and combustor secondary inlet air. A turbine, which includes a turbine wheel, is positioned fluidically and physically downstream of the combustor and is fluidically connected to the compressor to receive the hot combustor exhaust gas. A shaft mechanically connects the turbine and the compressor. The shaft is configured to transmit rotational energy from the turbine to the compressor to power the compressor. The shaft connects the turbine to the compressor through an annulus formed by the combustor surrounding the shaft and pump fuel from a fuel source to the combustor through a fuel duct in the shaft. A shaft cooling air pump is configured to provide suction to pull the second portion of compressed air through a plurality of hollow 1st stage turbine vanes positioned between the combustor and the turbine and into a turbine air plenum, and to further compress the second portion of the compressed air in the turbine air plenum before the second portion of the compressed air enters the combustor as fuel injector air and combustor secondary inlet air.

Another aspect of this disclosure is directed to a method of providing secondary compression for gas turbine engine combustor cooling air, including providing suction, with a shaft cooling air pump, to pull a second portion of compressed air exiting a compressor through a plurality of hollow 1st stage turbine vanes positioned between the combustor and the turbine, and into a turbine air plenum and further compressing, with the shaft cooling air pump, the second portion of the compressed air in the turbine air plenum before the second portion of the compressed air enters a combustor as fuel injector air and combustor secondary inlet air.

BRIEF DESCRIPTION OF THE DRAWINGS

FIG. 3A is a schematic view of the hollow cooled $1^{st}$ stage turbine vane cross section.

FIG. 3B is a schematic view of the hollow cooled $1^{st}$ stage turbine vanes.

FIG. 4 is a schematic view of a fuel-cooled aft bearing.

FIG. 5A is a schematic showing the arrangement of ID and OD quench tubes to create bulk swirl in the quench and lean zones of the combustor.

FIG. 5B is a downstream view (i.e., looking aft to front) of the arrangement of ID and OB quench tubes showing quench air flows exiting the ID and OD quench tubes.

FIG. 5C is an upstream view (i.e., looking front to aft) of the arrangement of ID and OD quench tubes.

FIG. 6A is an alternate view of FIG. 2A showing the location and orientation of pre-diffuser deswirl channels and vanes, turbine wheel cooling air deswirl channels and vanes, and combustor inlet deswirl vanes.

FIG. 6C is a flow chart showing the progression of rotating and static portions of the engine.

FIG. 8A is a schematic view a shaft fuel injection system.

FIG. 8B is a schematic view a shaft fuel injection system with multiple fuel orifices.

FIG. 8C is a more detailed schematic of the shaft fuel injection system.

FIG. 8D is perspective view of the shaft fuel injection system.

FIG. 9A is a schematic view a primary fuel flow (directed to combustor liner wall opposite fuel injector) and secondary fuel flow (directed to combustor liner wall adjacent to fuel injector).

FIG. 9B is an overhead view of the fuel injection system of FIG. 8A.

FIG. 9C is a schematic of one alternate configuration for the primary fuel flow of FIG. 8A.

FIG. 9D is an overhead view of the fuel injection system of FIG. 9C.

FIG. 9E is a schematic of another alternate configuration for the primary fuel flow of FIG. 8A.

FIG. 9F is an overhead view of the fuel injection system of FIG. 9E.

FIG. 10 is a schematic view of the combustor on an additive manufacturing build plate.

DETAILED DESCRIPTION

Small gas turbine engines are useful for a number of applications for which small size, high altitude relight capability, improved operability and lean blow out characteristics, and good operational life are desirable. In addition, it is often desirable that significant portions of such gas turbine engines can be made using additive manufacturing processes. Some previous small gas turbine engine designs were challenged by combustor designs that resulted in limited height recirculation zones, leading to limitations in altitude relight capabilities; reverse flow designs that resulted in hot exhaust combustor exhaust gases being cooled by combustor inlet air, thereby decreasing the energy available to recover in the turbine; fuel injection systems that rely on a pump and manifold for effective fuel distribution, resulting in a combustor package that was larger than desired; and ignitor positioning that resulted in a combustor that was undesirably long. The gas turbine engine, and particularly the combustor for the gas turbine engine, that is the subject of this disclosure includes features that address each of the shortcomings of previous small gas turbine engine designs.

Figure 1:
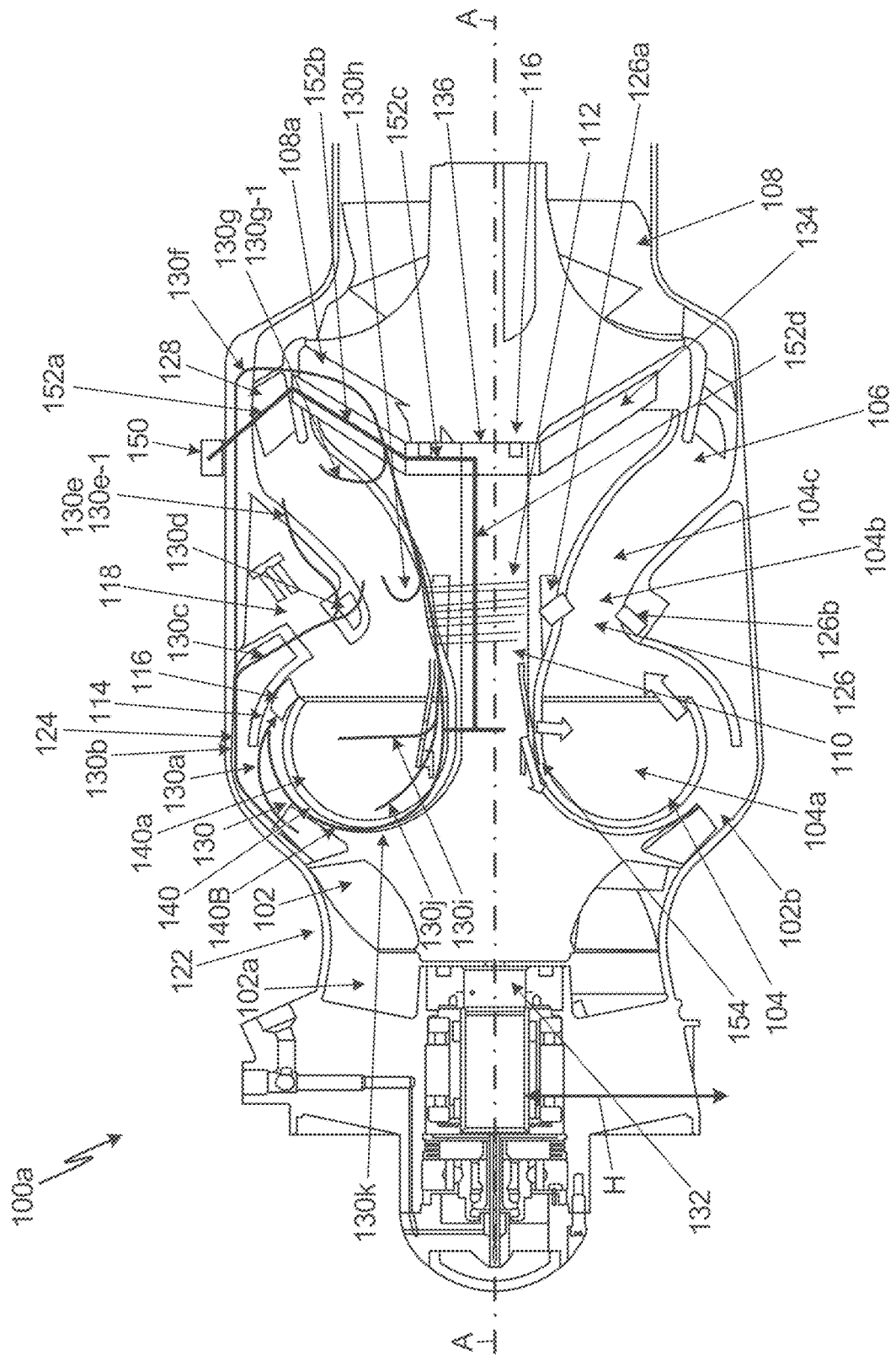
FIG. 1 is a cross section of an exemplary engine of the present disclosure.

Referring to FIG. 1, a gas turbine engine 100a of this disclosure includes a compressor 102 configured to receive inlet air at compressor inlet 102a and to generate compressed air 130 at an exit 102b of the compressor 102. A combustor 104 is fluidically connected to the compressor 102 to receive a first portion of the compressed air 130 as combustor primary inlet air 130a. The combustor 104 is positioned downstream of the compressor 102 both fluidically (i.e., compressed air flows from the compressor 102 to the combustor 104) and spatially (i.e., the combustor 104 is positioned physically downstream of the compressor 102 along an axis of rotation A). A turbine 108 is fluidically connected to the combustor 104 to receive hot combustor exhaust gas 106 from the combustor 104. The turbine 108 is positioned downstream of the combustor 104 both fluidically (i.e., hot combustor exhaust gas flows from the combustor 104 to the turbine 108) and spatially (i.e., the turbine 108 is positioned physically downstream of the combustor 104 along the axis of rotation A). Positioning the turbine 108 downstream of the combustor 104 separates the hot combustor exhaust gas 106 from compressed air 130 exiting the compressor 102, avoiding unwanted heat exchange between the hot combustor exhaust gas 106 and compressed air 130 that can occur in some prior designs. A shaft 110 mechanically connects the turbine 108 to the compressor 102 and transmits rotational energy from the turbine 108 to the compressor 102 to drive the compressor 102. Shaft 110 is supported by front bearing 132 and aft bearing 136, which surrounds the shaft immediately upstream of the turbine 108, and support the shaft 110 when it rotates in operation. As discussed in more detail below, the shaft 110 is further configured to pump fuel from a fuel source 150 and to direct the fuel to the combustor 104 through a fuel duct 152a-e in the shaft 110 and to further pressurize a portion of the compressor air through a shaft cooling air pump 112 before the second portion of the compressed air enters the combustor 104 as quench air 130d, 130h, fuel injector air 130i, 130j, and combustor secondary inlet air 130k.

While FIG. 1 depicts the compressor 102 as a centrifugal compressor and turbine 108 as a centrifugal turbine, a person of ordinary skill will recognize that an axial compressor and/or an axial turbine could be useful for certain applications. In the example of FIG. 1, the centrifugal compressor 102 and centrifugal turbine 108 were selected to provide the desired packaging (e.g., compact size, etc.) for the gas turbine engine 100a.

FIG. 1 further shows that the combustor 104 includes a rich combustion zone 104a configured as a toroidal recirculation zone to combust fuel with an air/fuel ratio less than 1; a rapid quench zone 104b fluidically downstream of the rich combustion zone 104a that is configured to receive and quench with quench air 130d, 130h combustion products (i.e., unburned fuel, carbon monoxide (CO) and other combustion product) from the rich combustion zone 104a; and a lean combustion zone 104c downstream of the rapid quench zone 104b. The lean combustion zone 104c is configured as a bulk swirl zone to complete combustion of the fuel with an air/fuel ratio greater than 1 and to generate hot combustor exhaust gases 106 that are directed to the turbine 108.

As mentioned above, the rich combustion zone 104a is configured as a toroidal recirculation zone with circulation provided air entering the combustor inlet 114 as combustor primary inlet air 130a and combustor secondary inlet air 130k and air entering the fuel injector 154 (as described in more detail below) as primary fuel injector air 130i and secondary fuel injector air 130j. The flow of combustor primary inlet air 130a, combustor secondary inlet air 130k, primary fuel injector air 130i, and secondary fuel injector air 130j into the rich combustion zone 104a creates a bulk swirl in an axial plane that can manifest itself as a counterclockwise rotation. Combustor primary inlet air 130a and combustor secondary inlet air 130k mix and are directed across combustor inlet deswirl vanes 116 that are configured to straighten airflow into the combustor and secondarily to provide structural support for the combustor liner 140 in the rich combustion zone 104a. The combustor inlet deswirl vanes 116 can further be configured as bluff bodies to create a quiescent flow zone downstream of the combustor inlet deswirl vanes 116 to support flame stability and desirable altitude relight and lean blow out characteristics as the air/fuel mixture in the rich combustion zone 104a flows toward ignitor 118. As shown in FIG. 1, the combustor inlet deswirl vanes 116 are positioned immediately upstream of ignitor 118 and provide a good environment for fuel ignition and sustained combustion. The ignitor 118 can be a spark ignitor or any other type of gas turbine engine ignitor that is deemed appropriate for the application. The ignitor 118 should be designed to provide ignition of a rich air/fuel mixture in the rich combustion zone 104a at all design conditions, including ground level and altitude conditions. As shown in FIGS. 1 and 2, positioning the ignitor 118 immediately downstream of the combustor inlet deswirl vanes 116 and above the quench zone inlet 126 permits the ignitor 118 to be packaged tightly within the combustor envelope to provide a combustor 104 much shorter than is typically the case with older designs that have an ignitor that extends lengthwise from the combustor.

To support flame stability and desired altitude relight and lean blow out characteristics, the rich combustion zone 104a is configured with a relatively large toroidal recirculation zone height H (i.e., the distance between the combustor inlet 114 and the fuel injector 154 to provide a desired (e.g., maximized or other appropriate) flow residence time in the rich combustion zone 104*a*. For example, the toroidal recirculation zone height H can be roughly the height of the compressor inlet 102*a*. Further the relatively large toroidal recirculation zone height H combined with airflow 130*a*, 130*i*, 130*j*, 130*k* into the rich combustion zone 104*a* creates a bulk swirl in an axial plane of the rich combustion zone 104*a*.

Combustion products exit the rich combustion zone 104*a* through quench zone inlet 126 where they mix rapidly with outer diameter (OD) quench air 130*d* and inner diameter (ID) quench air 130*h* that enter the quench zone 104*b* through ID quench tubes 126*a* and OD quench tubes 126*b*. Quench zone inlet 126 is configured as a converging nozzle to accelerate unburned fuel and rich combustion zone 104*a* products into the quench zone to promote mixing with the quench air 130*c*, 130*h*. The orientation of the quench tubes, which can be 45°, create a bulk swirl in a circumferential plane that also promotes rapid mixing of rich combustion zone 104*a* products with the quench air 130*d*, 130*h*. The mixture of unburned fuel, rich combustion zone 104*a* products, and quench air 130*c*, 130*h* exits the quench zone 104*b* and enters the lean combustion zone 104*c* where OD combustor liner cooling air 130*e* and ID combustor liner cooling air 130*g* is added through a plurality of OD aft combustor liner cooling air trim holes 130*e*-1 and a plurality of ID aft combustor liner cooling air trim holes 130*g*-1 to create lean combustion conditions (i.e., air/fuel ratio greater then 1) to complete combustion. The bulk circumferential swirl generated in the quench zone 104*b* continues through the lean combustion zone 104*c* to provide thorough mixing of unburned fuel, rich combustion zone 104*a* products, and air streams 130*d*, 130*e*, 130*g*, and 130*h*. Combustor exhaust gas 106 exits the combustor 104 by flowing across a plurality of hollow 1$^{st}$ stage turbine vanes 128 positioned between the combustor 104 and the turbine 108 to remove the bulk circumferential swirl created in the lean combustion zone 104*c* before the combustor exhaust gas 106 enters the turbine 108. The plurality of hollow 1$^{st}$ stage turbine vanes 128 are further configured to provide structural support for the combustor liner 140 in the lean combustion zone 104*c*. FIGS. 3*a* and 3*b* show more detailed views of the hollow 1$^{st}$ stage turbine vanes 128.

Figure 2A:
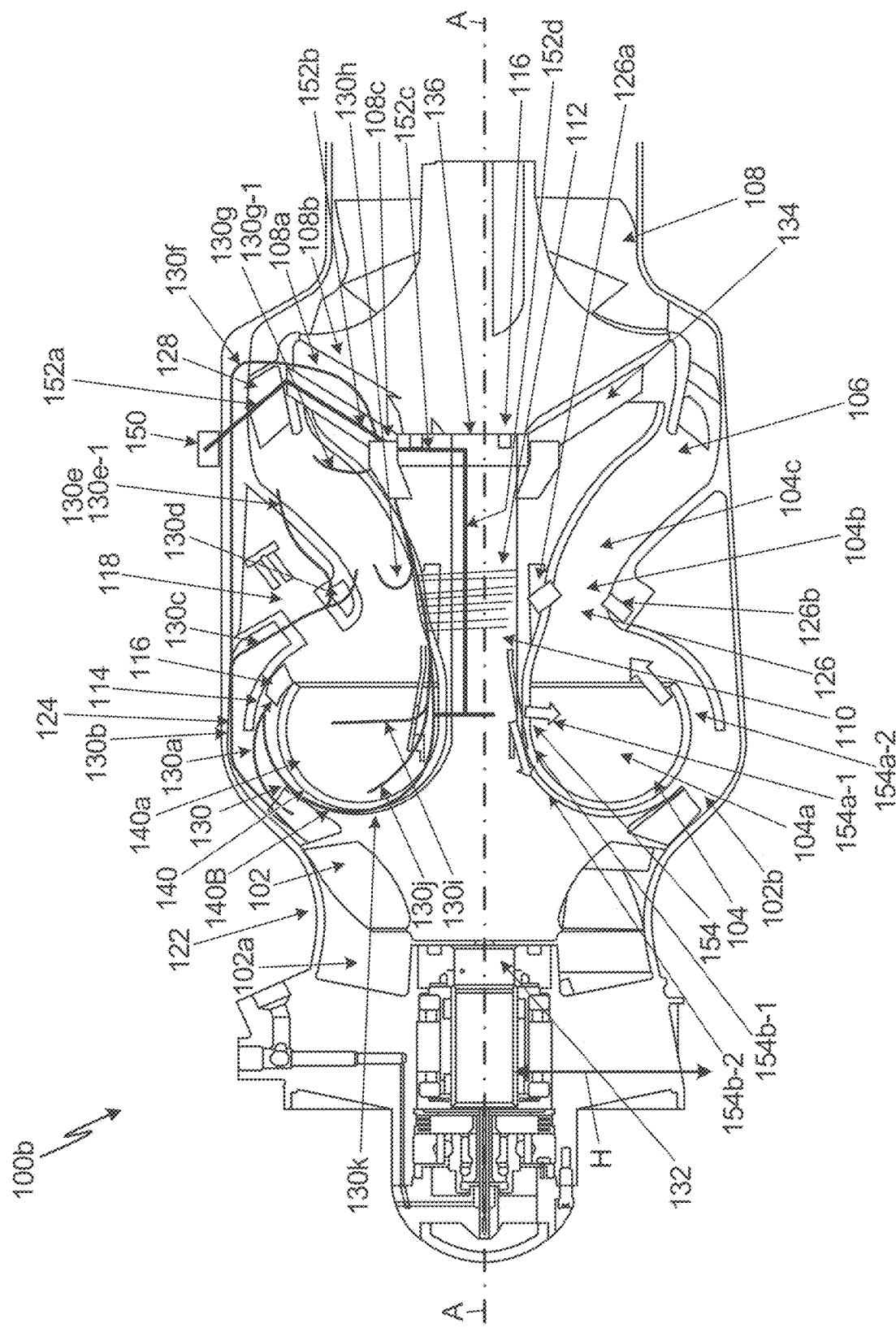
FIG. 2A is a cross section of another exemplary engine of the present disclosure.
Figure 2B:
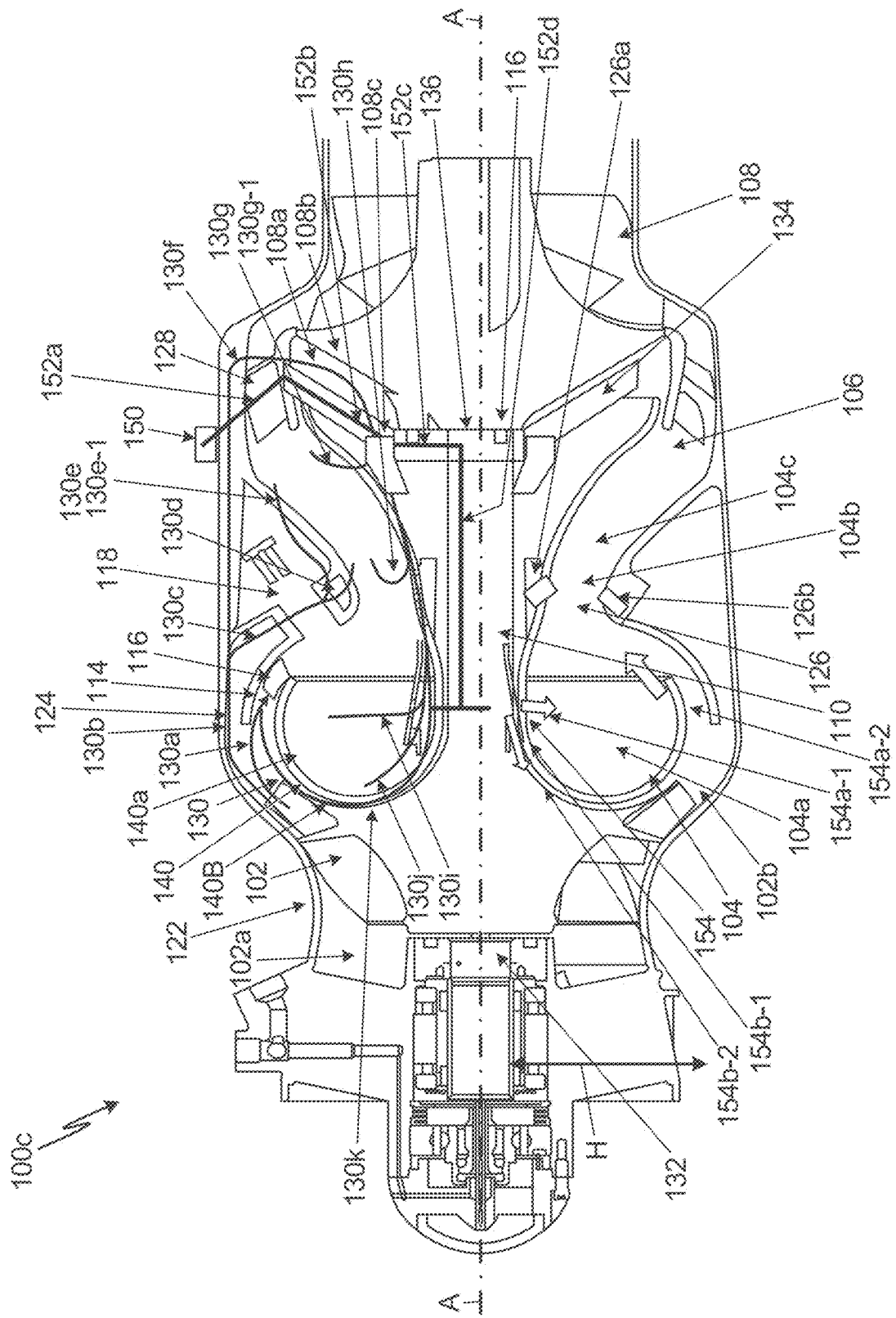
FIG. 2B is a cross section of yet another exemplary engine of the present disclosure.

FIGS. 2A and 2B, which will be described with FIG. 1, shows airflow through gas turbine engine 100*b*. Gas turbine engine 100*b* is very similar to gas turbine engine 100*a* shown in FIG. 1 with the addition of a turbine wheel compression stage 108*b* and turbine wheel deswirl vanes 108*c*, both of which are discussed later in this disclosure. As discussed above, compressed air 130 exits the compressor 102 at the compressor exit 102*b* is divided into a combustor primary air stream 130*a*, which enters the combustor 104 at the combustor inlet 114, and a second portion 130*b* of compressed air, which enters cooling air flow path 124 becomes the source of all of the further airflows described below. Cooling air flow path 124 follows the exterior 140*b* of the combustor liner 140 (i.e., the outer combustor liner wall 140*b*) to cool the combustor liner 140, which defines the perimeter of the combustor 104, and supply the airflows described below, essentially creating a 360° cooling loop surround the combustor liner 140. The inner combustor liner wall 140*a* defines the inner perimeter of the combustor 104 that is exposed to combustion. The outer combustor liner wall 140*b* defines the outer perimeter of the combustor 104 that is exposed to cooling air.

A portion of the second portion 130*b* of compressed air becomes OD air 130*c*, which splits into the OD quench air 130*d* and OD combustor liner cooling air 130*e*. The OD quench air 130*d* enters the quench zone 104*b* through OD quench tubes 126*b*, which are described in more detail below. The OD combustor liner cooling air 130*e* enters the lean combustion zone 104*c* downstream of the OD quench tubes 126*b* to provide cooling and supplemental combustion air in the lean combustion zone 104*c*. The OD combustor liner cooling air 130*e* can be configured to enter the lean combustion zone 104*c* through film cooling holes (not shown) or any other feature that can create a layer of air attached to the inner combustor liner wall 140*a* of the lean combustion zone 104*c* to provide effective cooling and/or larger sized film cooling holes to tailor a radial temperature profile going in the hollow 1$^{st}$ stage turbine vanes 128. The remaining amount of the second portion 130*b* of compressed air flows around the combustor 104 as ID air 130*f* to provide cooling and combustion air to other portions of the combustor 104.

ID air 130*f* first flows through the hollow 1$^{st}$ stage turbine vanes 128 to provide cooling and then into a turbine air plenum 108*a* positioned between the turbine 108 and the combustor 104. In the example of gas turbine engine 100*a* (FIG. 1), the ID air 130*f* then splits into ID combustor liner cooling air 130*g* and ID quench air 130*h* with the remaining ID air 130*f* continuing through shaft cooling air pump 112. In the example of gas turbine engine 100*b* (FIG. 2A), the ID air 130*f* is further compressed by turbine wheel compression stage 108*b* after which it flows through turbine wheel deswirl vanes 108*c* before splitting into ID combustor liner cooling air 130*g* and ID quench air 130*h*. As with gas turbine engine 100*a*, the remaining ID air 130*f* continues through shaft cooling air pump 112. In both examples, ID combustor liner cooling air 130*g* enters the lean combustion zone 104*c* downstream of the ID quench tubes 126*b* to provide cooling and supplemental combustion air in the lean combustion zone 104*c*. As with the OD combustor liner cooling air 130*e*, ID combustor liner cooling air 130*g* can be configured to enter the lean combustion zone 104*c* through film cooling holes (not shown) or any other feature that can create a layer of air attached to the inner combustor liner wall 140*a* of the lean combustion zone 104*c* to provide effective cooling and/or larger sized film cooling holes to tailor a radial temperature profile going in the hollow 1$^{st}$ stage turbine vanes 128. ID quench air 130*h* enters the quench zone 104*b* through ID quench tubes 126*a*, which are described in more detail below. Shaft cooling air pump 112, turbine wheel compression stage 108*b*, and turbine wheel deswirl vanes 108*c* are also described in more detail below.

Cooling air exiting the shaft cooling air pump 112 ultimately splits into three streams: primary fuel injector air 130*i*, secondary fuel injector air 130*k*, and combustor secondary inlet air 130*k*. As described further below, both primary fuel injector air 130*i* and secondary fuel injector air 130*k* mix with fuel in fuel injector 154 and enter rich combustion zone 104*a*. The combustor secondary inlet air 130*k* flows around the outside of rich combustion zone 104*a* liner to provide cooling before mixing with combustor primary inlet air 103*a* across the combustor inlet deswirl vanes 116 at the combustor inlet 114. The distribution of compressed air 130 across each of the stream described here depend on the requirements of each specific application. In one example, the distribution of compressed air 130 can be as shown in the following table. A person of ordinary skill will recognize that many other distributions of compressed air 130 are possible.

Table of Air Streams

| Air Stream | Percentage of Total Compressed Air 130 |
| --- | --- |
| Combustor primary air 130a | 10 |
| Second portion 130b of compressed air | 90 |
| OD air 130c | 25 |
| OD quench air 130d | 20 |
| OD combustor liner cooling air 130e | 5 |
| ID air 130f | 65 |
| ID combustor liner cooling air 130g | 5 |
| ID quench air 130h | 20 |
| Primary fuel injector air 130i + Secondary fuel injector air 130j | 15 |
| Combustor secondary inlet air 130k | 5 |
| Compressed air 130 | 100 |

Circulating cooling air about the combustor 102 as described above and facilitated by the shaft cooling air pump 112 provides cooling to all relevant portions of the combustor 102, permitting the combustor 102 to operate at desired temperatures while maintaining a desired operational life. Moreover, using cooling air to cool the hollow $1^{st}$ stage turbine vanes 128, permits the combustor 102 to operate with a higher exhaust temperature than would be the case without cooling the $1^{st}$ stage turbine vanes. The higher combustor exhaust gas 106 temperature enhances energy available for recovery in the turbine 108 and for use as propulsion.

FIG. 2A also shows fuel flow through gas turbine engine 100b (which applies equally to gas turbine engine 100a in FIG. 1) Fuel flows from fuel source 150 through a series of fuel ducts 152a-e toward a plurality of fuel injectors 154, providing cooling along the way. First, fuel flow through fuel duct 152a to hollow strut 134, which provide structural support for the shaft 110 and aft bearing 136 on top of hollow $1^{st}$ stage turbine vanes 128. Being positioned in a hot portion of gas turbine engine 100b (or 100a) downstream of the combustor 104, both the hollow strut 134 and aft bearing 136 require cooling to retain structural integrity and to function as desired. A person of ordinary skill will recognize that the hollow strut 134 and aft bearing 136 can be of any design that will allow them to support shaft 110 as it rotates in operation. Fuel can be supplied to the shaft 110 through one or more of the hollow struts 134 in fuel channel 152b, which can be part of the structure of hollow strut 134 and can be insulated to prevent coking within the hollow $1^{st}$ stage turbine vanes 128. Inner diameter air 130f also provides cooling to the hollow struts 134. As shown in more detail in FIG. 4, fuel exiting the hollow strut 134 flows through fuel channel 152c to and through aft bearing 136 to provide the required cooling. Fuel exiting aft bearing 136 enters fuel channel 152d, which runs through shaft 110. As described further below, rotation of shaft 110 provides pumping action to pull fuel from fuel source 150, through fuel ducts 152a-d and into fuel duct 152e. Fuel from fuel duct 152e flows into fuel injector 154 where it then enters rich combustion zone 104a as described further below.

FIGS. 5A-C, which will be discussed together, further illustrate the arrangement of the ID quench tubes 126a and the OD quench tubes 126b. As discussed above, the quench zone 104b of the combustor 104 is positioned downstream of the rich combustion zone 104a. The quench zone 104b is configured as an annulus having a cross-section smaller than the height of the rich combustion zone 104a, forming a converging annulus that can accelerate combustion products from the rich combustion zone 104a as they flow into the quench zone 104b and mix with OD quench air 130c from OD quench tubes 126b and ID quench air 130h from ID quench tubes 126a. FIG. 5A is a schematic showing the arrangement of ID and OD quench tubes 126a, 126b to create bulk swirl in the quench 104b and lean 104c zones of the combustor 104. As shown in FIG. 5A, the ID and OD quench tubes 126a, 126b are angled in the same direction around the quench zone 104b to create the desired bulk swirl. While the ID and OD quench tubes 126a, 126b can have any angle, it might be desirable for each of the ID and OD quench tubes 126a, 126b to have the same angle. The angle for the ID and OD quench tubes 126a, 126b can be selected to provide the desired bulk swirl and can also be selected to facilitate manufacturability. For example, if the ID and OD quench tubes 126a, 126b will be formed using additive manufacturing techniques, it might be desirable to orient the ID and OD quench tubes 126a, 126b at 45°, which is an angle that is convenient to make using additive manufacturing techniques.

FIG. 5B is a downstream view (i.e., looking aft to front along axis A of FIGS. 1 and 2) of the arrangement of ID and OB quench tubes 126a, 126b showing quench air flows 130c, 130h as they are received and directed by the ID and OD quench tubes 126a, 126b. Shaft 110 is shown as it passes through the combustor 104. FIG. 5C is an upstream view (i.e., looking front to aft along axis A of FIGS. 1 and 2) of the arrangement of ID and OD quench tubes 126a, 126b. While FIGS. 5A-5C show 8 ID quench nozzles 126a and 12 OD quench tubes 126b, it should be understood that any number of ID quench tubes 126a and OD quench tubes 126b appropriate to create the desired bulk swirl through the quench zone 104b and lean combustion zone 104c can be used. Further, the positioning of the ID quench tubes 126a and OD quench tubes 126b can be selected to fluidically isolate the rich combustion zone 104a from the rapid quench zone 104b. Additionally, it should be understood that the diameter, geometry, and other mechanical dimensions of the ID quench tubes 126a and OD quench tubes 126b should be selected to provide the desired bulk swirl through the quench zone 104b and lean combustion zone 104c. As can be seen in FIGS. 5B and 5C, it may be desirable to angle the ID quench tubes 126a and OD quench tubes 126b downstream to entrain the unburned fuel and rich combustion zone 104a products as they flow through the quench zone 104b into the lean combustion zone 104c. Further, the geometry of the ID quench tubes 126a and OD quench tubes 126b can be selected to have a constant circular cross section, a decreasing cross section (i.e., a convergent nozzle), an increasing cross section (i.e., a divergent nozzle) for a single tube, all of the tubes, or any combination of the tubes depending on the requirements of a particular application. Appropriate selection of the number, spacing, angling, geometry, and mechanical dimensions of the ID quench tubes 126a and OD quench tubes 126b can be used to tailor the combustor 104 exit temperature and pattern factor (PF), which is defined as $PF=(T4_{peak}-T4_{avg})/T4_{avg}$ where T4 is the combustor 104 exit temperature. Typically, a lower pattern factor (i.e., even temperature distribution) is a desirable design criterion.

Figure 6B:
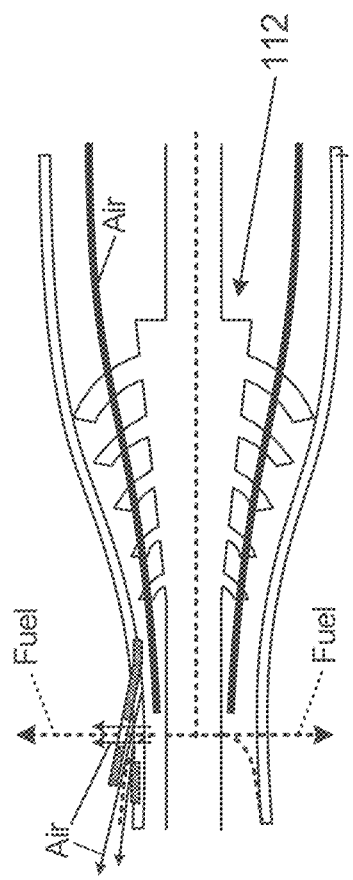
FIG. 6B is another view of the shaft cooling air pump of FIG. 6A depicting air and fuel flow.
Figure 7A:
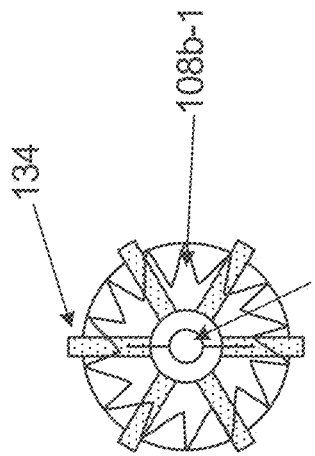
FIG. 7A is one example of a shaft cooling air pump of this disclosure.
Figure 7B:
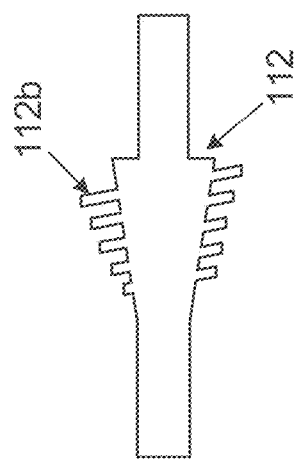
FIG. 7B is another example of a shaft cooling air pump of this disclosure.
Figure 7C:
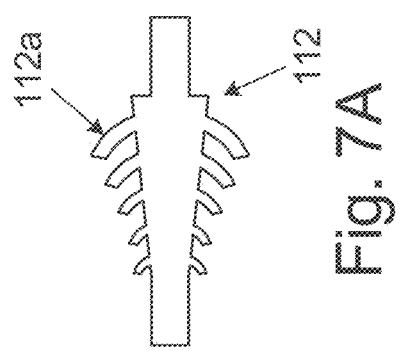
FIG. 7C is another view of the shaft cooling air pump of FIG. 6B.
Figure 7E:
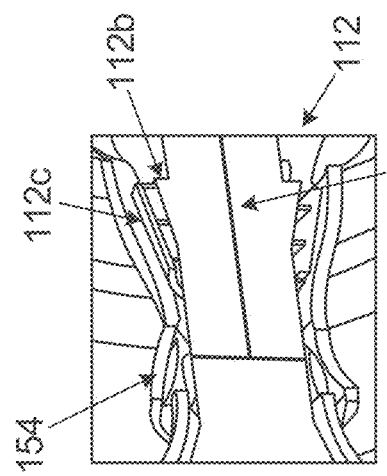
FIG. 7E is a third example of a shaft cooling air pump of this disclosure, including a turbine wheel with vanes to pump inner diameter combustor air.
Figure 7D:
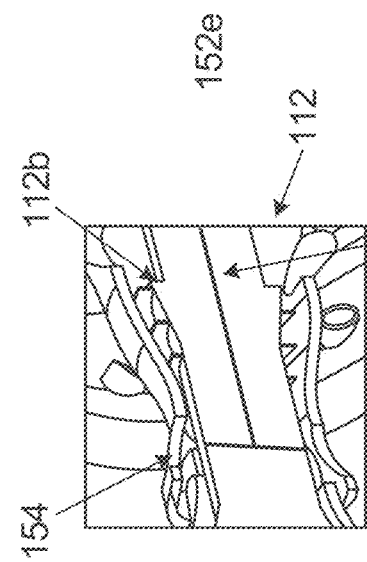
FIG. 7D is another view of the shaft cooling air pump of FIG. 6B in which the pump threads are shrouded.

FIG. 6A is an alternate view of FIG. 2 showing additional features related to the supercharging (i.e., supplemental compression) of ID cooling air 130f. As discussed above, after providing cooling to the hollow cooled $1^{st}$ stage turbine vanes 128, ID cooling air 130f flows into turbine air plenum 108a. In the example of FIG. 1, ID cooling air 130f provides ID combustor liner cooling air 130g and ID quench air 130h before entering shaft cooling air pump 112. Shaft cooling air pump 112 can be any mechanical pump, such as the screw pump depicted in FIGS. 1, 2, and 6A, that can further compress (i.e., further pressurize) cooling air to provide sufficient energy for the primary fuel injector air 130$i$, secondary fuel injector air 130$j$, and combustor secondary inlet air 130$k$ to flow to their respective destinations as described above. In so doing, shaft cooling air pump 112 also provides suction to transport ID cooling air 130$f$ to flow along the combustor 104 liner, hollow cooled 1$^{st}$ stage turbine vanes 128, and turbine air plenum 108$a$ as described above. FIGS. 7A and 7B show two possible configurations for shaft cooling air pump 112 shaft cooling air pump 112 are possible as well. FIG. 7A shows shaft cooling air pump 112 with arched vanes 112$a$. FIG. 7B shows shaft cooling air pump 112 with straight screw threads 112$b$. FIG. 7C shows a perspective view of the shaft cooling air pump 112 of FIG. 7B. FIG. 7D is similar to FIG. 7C and shows the shaft cooling air pump 112 straight screw threads 112$b$ with shrouds 112$c$, which are positioned on radially outboard tip of the straight screw threads 112$b$. The shrouds 112$c$ are configured to maintain a desired velocity for the compressed air flowing through the cooling air flow path 124. Arched screw threads 112$a$, unshrouded or shrouded, or straight screw threads 112$b$, shrouded or unshrouded, or any other configuration can be selected to provide the desired additional compression for the cooling air. Also, the screw threads 112$a$, 112$b$ can be configured to engage with the outer combustor liner wall 140$b$ to cause the outer combustor liner wall 140$b$ to function as an outer shroud for the screw threads 112$a$, 112$b$. The pitch of the screw threads 112$a$, 112$b$ and rotational speed of the shaft 110 determine the flow rate of compressed air exiting the shaft cooling air pump 112. Further the configuration of the plurality of shaft cooling air pump 112 screw threads 112$a$, 112$b$ can be selected to facilitate construction using additive manufacturing techniques. For example, arched screw threads 112$a$ may be more amendable to construction using additive manufacturing techniques then straight threads 112$b$.

Figure 7F:
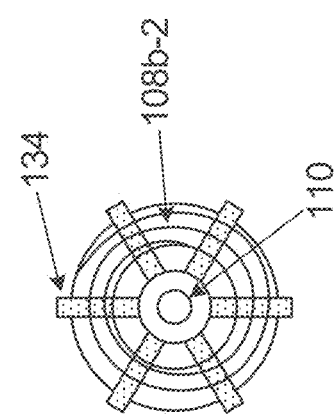
FIG. 7F is a fourth example of a shaft cooling air pump of this disclosure, including a turbine wheel with helix scroll to pump inner diameter combustor air.

Returning to FIG. 6A, turbine wheel compression stage 108$b$ can provide further supercharging (i.e., supplemental compression) of ID cooling air 130$f$ in addition to that provided by shaft cooling air pump 112 or instead of that provided by shaft cooling air pump 112. Turbine wheel compression stage 108$b$ can of any design that can provide supplemental compression of ID cooling air 130$f$ flowing through turbine air plenum 108$a$. As shown in FIGS. 6A and 7E, the turbine wheel compression stage 108$b$ can include a plurality of compression blades 108$b$-1 that are configured to rotate with the turbine 108 and compress ID cooling air 130$f$ flowing through turbine air plenum 108$a$. The plurality of compression blades 108$b$-1 can be further configured to engage with a plurality of strut shrouds 134$a$ positioned on the struts 134 to provide additional compression for ID cooling air 130$f$ flowing through the turbine air plenum 108$a$. Alternately, as shown in FIG. 7F the turbine wheel compression stage 108$b$ can be a scroll compressor 108$b$-2 that is configured to rotate with the turbine 108 and compress ID cooling air 130$f$ flowing through turbine air plenum 108$a$. A person of ordinary skill will recognize that other options are available for turbine wheel compression stage 108$b$.

FIG. 6C is a flow chart showing the progression of rotating and static portions of the gas turbine engine 100$a$, 100$b$ as a companion to FIG. 6A, which shows the location and orientation of pre-diffuser deswirl channels and vanes 120, turbine wheel cooling air deswirl channels and vanes 108$c$, and combustor inlet deswirl vanes 116. As known in the art, rotating stages in gas turbine engines, such as engines 100$a$, 100$b$, are typically followed by stationary vane stages to remove swirl imparted by the rotating stages. That is the function that the pre-diffuser deswirl channels and vanes 120, turbine wheel cooling air deswirl channels and vanes 108$c$, and combustor inlet deswirl vanes 116 that are depicted in FIG. 6A perform. As a secondary function, the pre-diffuser deswirl vanes 120 can be configured to provide further structural support for the combustor liner 140 in the rich combustion zone 104$a$.

FIGS. 8A-D and 9A-F, which will be discussed together with FIG. 2, further illustrate the fuel injector 154 and fuel and air flow through the fuel injector 154. As shown in FIG. 2, fuel enters the toroidal recirculation zone of the rich combustion zone 104$b$ through the fuel injector 154 in two steams, a primary fuel flow 154$a$-1 which flows radially across the rich combustion zone 104$b$ where it impinges on a "splash plate" portion of the combustor liner wall 154$a$-2 (i.e., part of the inner combustor liner wall 140$a$) and a secondary fuel flow 154$b$-1 which flows circumferentially along the combustor liner wall 154$b$-2 adjacent to and immediately downstream of the fuel injector 154. The fuel streams mix with the air and the remaining liquid fuel films and vaporize as they impinge on their respective portions of the combustor liner wall 154$a$-2, 154$b$-2 to form a combustible mixture with air in the rich combustion zone 104$b$. The flow of fuel and air in the toroidal recirculation zone, include primary fuel injector air 130$i$ that enters with the primary fuel flow 154$a$-1 and secondary fuel injector air 130$j$ that enters with the secondary fuel flow 154$b$-1, carriers fuel that films and vaporizes at the "splash plate" portion of the combustor liner wall 154$a$-2 toward the ignitor 118 where it ignites to support combustion in the rich combustion zone 104$a$. FIGS. 8A and 8B show more detailed schematics of the primary fuel flow 154$a$-1 and secondary fuel flow 154$b$-1 entering the rich combustion zone 104$a$. FIGS. 8C and 8D show an example of fuel injectors 154 having a lozenge-shaped opening, though opening of any other shape-particularly shapes suitable for construction using additive manufacturing techniques can be used. The fuel injected from the rotating shaft 152 enters the inner combustor liner wall 140$a$ through apertures 154 in the inner combustor liner wall 140$a$ and becomes primary fuel flow 154$a$-1 or hits the inner combustor liner wall 140$a$ and is mixed with air through adjacent lozenge-shaped openings 154$c$ that function as converging/diverging nozzles that accelerate secondary fuel injection air 130$j$ as it mixes with the secondary fuel flow 154$b$-1.

FIGS. 9A-F show other illustrations of the fuel injector 154 and fuel and air flow and mixing through the fuel injector 154. FIG. 9A is an exemplary configuration that shows primary fuel flow 154$a$-1, primary fuel injector air 130$i$, secondary fuel flow 154$b$-1, and secondary fuel injector air 130$j$. FIG. 9B is another view of the fuel injector 154 of FIG. 9A "unwrapped" to show the plurality of primary fuel flows 154$a$-1, primary fuel injector air 130$i$ flows, secondary fuel flows 154$b$-1, and secondary fuel injector air 130$j$ flows. FIG. 9D shows an another exemplary configuration for the fuel injector 154, which can be described as an arch that forms a self-supporting wall that limits the amount of abutment material to prevent fuel blockage. FIGS. 9E-F show yet another exemplary configuration for the fuel injector 154, which can be described as an "stub" or "bump-out" to distribute the primary fuel flow 154$a$-1 closer to the "splash plate" portion of the combustor liner wall 154$a$-2.

As discussed throughout this disclosure, various elements of the gas turbine engines 100$a$, 100$b$ can be constructed with additive manufacturing techniques, including but not limited to Powder Bed Fusion-Laser/Electron Beam, Directed Energy Deposition, and other additive manufacturing techniques. As shown in FIG. 10, the combustor 104 described in this disclosure can be built "vertically" on an additive manufacturing build plate 160. Depending on the combustor 104 design and additive manufacturing technique selected, other features such as the combustor inlet deswirl vanes 116, ID and OD quench tubes 126a, 126b and hollow cooled 1$^{st}$ stage turbine vanes 128 can be made as part of the same build campaign as the combustor 104. The gas turbine engines 100a, 100b of this disclosure can be made from any materials appropriate for the desired application and selected manufacturing techniques, including additive manufacturing techniques.

The gas turbine engines described in this disclosure can be characterized as being useful for applications for which small size, high altitude relight capability, improved operability and lean blow out characteristics, and good operational life are desirable. In particular, the gas turbine engines of this disclosure have larger height recirculation zones to support altitude relight capabilities and flame stability. The arrangement of the combustor and integration of the ignitor into the combustor supports compact packaging that makes the gas turbine engines suitable for a number of applications for which previous designs were challenged. The use of supercharged combustor cooling promotes combustor durability and good airflow through the combustor. The integrated shaft fuel injection dispenses with the need for a separate fuel pump and contributes to the integration of the ignitor into a compact combustor package.

Discussion of Possible Embodiments

The following are non-exclusive descriptions of possible embodiments of the present invention.

A gas turbine engine includes a compressor configured to receive inlet air at a compressor inlet and generate compressed air at a compressor exit, a combustor positioned fluidically and physically downstream of the compressor, a turbine positioned fluidically and physically downstream of the combustor, and a shaft mechanically connecting the turbine and the compressor. The combustor is fluidically connected to the compressor to receive a first portion of the compressed air as combustor primary inlet air. The combustor includes a combustor liner having an inner combustor liner and an outer combustor liner, surrounding one or more combustion zones. A cooling air flow path is configured to direct a second portion of the compressed air around the outer combustor liner to cool the combustor liner and to provide a source of quench air, inner combustor liner cooling air, fuel injector air, and combustor secondary inlet air. A turbine, which includes a turbine wheel, is positioned fluidically and physically downstream of the combustor and is fluidically connected to the compressor to receive the hot combustor exhaust gas. A shaft mechanically connects the turbine and the compressor. The shaft is configured to transmit rotational energy from the turbine to the compressor to power the compressor. The shaft connects the turbine to the compressor through an annulus formed by the combustor surrounding the shaft and pump fuel from a fuel source to the combustor through a fuel duct in the shaft. A shaft cooling air pump is configured to provide suction to pull the second portion of compressed air through a plurality of hollow 1st stage turbine vanes positioned between the combustor and the turbine and into a turbine air plenum, and to further compress the second portion of the compressed air in the turbine air plenum before the second portion of the compressed air enters the combustor as fuel injector air and combustor secondary inlet air.

The gas turbine engine of the preceding paragraph can optionally include, additionally and/or alternatively, any one or more of the following features, configurations and/or additional elements:

The gas turbine engine of the preceding paragraph, wherein the shaft cooling air pump comprises a plurality of screw threads positioned on the shaft in the cooling air flow path, wherein the screw threads are configured to compress the second portion of the compressed air flowing through the cooling air flow path.

The gas turbine engine of the preceding paragraph, wherein a pitch of the plurality of screw and a rotational speed of the shaft when in operation determines a flowrate of compressed air exiting the shaft cooling air pump.

The gas turbine engine of the preceding paragraph, wherein the plurality of screw threads engage with the outer combustor liner such that the outer combustor liner functions an outer shroud for the plurality of screw threads.

The gas turbine engine of the preceding paragraph, wherein the plurality of screw threads further comprise a shroud positioned on radially outboard tips of the screw threads and the shroud is configured to maintain a desired velocity for the compressed air flowing through the cooling air flow path.

The gas turbine engine of the preceding paragraph, wherein the plurality of screw threads comprise arched threads, The gas turbine engine of the preceding paragraph, wherein the plurality of screw threads comprise straight threads.

The gas turbine engine of the preceding paragraph, wherein the screw threads are further configured to increase air velocity and pressure upstream of a fuel injector in the combustor to enhance injection of fuel into rich combustion zone in the combustor.

The gas turbine engine of any of the preceding paragraphs, wherein the shaft cooling air pump comprises a plurality of compression blades positioned on the turbine wheel in the cooling air flow path, wherein the plurality of compression blades are configured to compress the second portion of the compressed air flowing through the cooling air flow path and the gas turbine engine further comprises a plurality of turbine wheel deswirl vanes positioned in the cooling air flow path downstream of the plurality of compression blades positioned on the turbine wheel.

The gas turbine engine of the preceding paragraph, further comprising a shroud positioned on each of the plurality of hollow structs, wherein the shroud is configured to interact with the plurality of compression bladed positioned on the turbine wheel to compress the second portion of the compressed air flowing through the cooling air flow path.

The gas turbine engine of any of the preceding paragraphs, wherein the shaft cooling air pump further comprises a plurality of compression blades positioned on the turbine wheel in the cooling air flow path, wherein the plurality of compression blades are configured to compress the second portion of the compressed air flowing through the cooling air flow path and the gas turbine engine further comprises a plurality of turbine wheel deswirl vanes positioned in the cooling air flow path downstream of the plurality of compression blades positioned on the turbine wheel.

The gas turbine engine of the preceding paragraph, further comprising a shroud positioned on each of the plurality of hollow structs, wherein the shroud is configured to interact with the plurality of compression bladed positioned on the turbine wheel to compress the second portion of the compressed air flowing through the cooling air flow path.

The gas turbine engine of any of the preceding paragraphs, wherein the shaft cooling air pump comprises a scroll compressor positioned on the turbine wheel in the cooling air flow path, wherein the scroll compressor is configured to compress the second portion of the compressed air flowing through the cooling air flow path and the gas turbine engine further comprises a plurality of turbine wheel deswirl vanes positioned in the cooling air flow path downstream of the scroll compressor positioned on the turbine wheel.

The gas turbine engine of any of the preceding paragraphs, wherein the shaft cooling air pump further comprises a scroll compressor positioned on the turbine wheel in the cooling air flow path, wherein the scroll compressor is configured to compress the second portion of the compressed air flowing through the cooling air flow path and the gas turbine engine further comprises a plurality of turbine wheel deswirl vanes positioned in the cooling air flow path downstream of the scroll compressor positioned on the turbine wheel.

The gas turbine engine of any of the preceding paragraphs, wherein the combustor further comprises: a toroidal recirculation zone configured to receive and combust fuel in a rich combustion zone; an ignitor positioned to ignite an air/fuel mixture in the rich combustion zone; a rapid quench zone downstream of the toroidal recirculation zone, wherein the rapid quench zone is configured to receive and quench with quench air combustion products from the rich combustion zone, wherein the rapid quench zone includes an array of quench tubes; and a lean combustion zone downstream of the rapid quench zone, wherein the lean combustion zone is configured to complete combustion of the fuel and to generate hot combustor exhaust gas.

A method of providing secondary compression for gas turbine engine combustor cooling air includes providing suction, with a shaft cooling air pump, to pull a second portion of compressed air exiting a compressor through a plurality of hollow 1st stage turbine vanes positioned between the combustor and the turbine, and into a turbine air plenum and further compressing, with the shaft cooling air pump, the second portion of the compressed air in the turbine air plenum before the second portion of the compressed air enters a combustor as fuel injector air and combustor secondary inlet air.

The method of the preceding paragraph can optionally include, additionally and/or alternatively, any one or more of the following features, configurations and/or additional elements:

The method of the preceding paragraph, wherein the shaft cooling air pump comprises a plurality of screw threads positioned on a shaft in the cooling air flow path, wherein the screw threads are configured to compress the second portion of the compressed air flowing through the cooling air flow path and wherein the shaft mechanically connects the turbine and the compressor, wherein the shaft is configured to transmit rotational energy from the turbine to the compressor to power the compressor, wherein the shaft connects the turbine to the compressor through an annulus formed by the combustor surrounding the shaft.

The method of the preceding paragraph, wherein the shaft cooling air pump comprises a plurality of compression blades positioned on a turbine wheel in the cooling air flow path, wherein the plurality of compression blades are configured to compress the second portion of the compressed air flowing through the cooling air flow path and the gas turbine engine further comprises a plurality of turbine wheel deswirl vanes positioned in the cooling air flow path downstream of the plurality of compression blades positioned on the turbine wheel.

The method of the preceding paragraph, wherein the shaft cooling air pump comprises a scroll compressor positioned on the turbine wheel in the cooling air flow path, wherein the scroll compressor is configured to compress the second portion of the compressed air flowing through the cooling air flow path and the gas turbine engine further comprises a plurality of turbine wheel deswirl vanes positioned in the cooling air flow path downstream of the scroll compressor on the turbine wheel.

The method of the preceding paragraph, wherein the shaft cooling air pump further comprises a plurality of compression blades positioned on a turbine wheel in the cooling air flow path, wherein the plurality of compression blades are configured to compress the second portion of the compressed air flowing through the cooling air flow path and the gas turbine engine further comprises a plurality of turbine wheel deswirl vanes positioned in the cooling air flow path downstream of the plurality of compression blades positioned on the turbine wheel; or wherein the shaft cooling air pump comprises a scroll compressor positioned on the turbine wheel in the cooling air flow path, wherein the scroll compressor is configured to compress the second portion of the compressed air flowing through the cooling air flow path and the gas turbine engine further comprises a plurality of turbine wheel deswirl vanes positioned in the cooling air flow path downstream of the scroll compressor on the turbine wheel.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A gas turbine engine comprising:
 a compressor configured to receive inlet air at a compressor inlet and generate compressed air at a compressor exit;
 a combustor positioned fluidically and physically downstream of the compressor, wherein the combustor is fluidically connected to the compressor to receive a first portion of the compressed air as combustor primary inlet air and wherein the combustor comprises a combustor liner surrounding one or more combustion zones, wherein the combustor liner includes an inner combustor liner and an outer combustor liner:
 a cooling air flow path configured to direct a second portion of the compressed air around the outer combustor liner to cool the combustor liner and to provide a source of quench air, inner combustor liner cooling air, fuel injector air, and combustor secondary inlet air;
 a turbine positioned fluidically and physically downstream of the combustor, wherein the turbine includes a turbine wheel and is fluidically connected to the compressor to receive the hot combustor exhaust gas;

a shaft mechanically connecting the turbine and the compressor, wherein the shaft is configured to:
  transmit rotational energy from the turbine to the compressor to power the compressor, wherein the shaft connects the turbine to the compressor through an annulus formed by the combustor surrounding the shaft; and
  pump fuel from a fuel source to the combustor through a fuel duct in the shaft; and
a shaft cooling air pump configured:
  to provide suction to pull the second portion of compressed air through a plurality of hollow $1^{st}$ stage turbine vanes positioned between the combustor and the turbine and into a turbine air plenum; and
  to further compress the second portion of the compressed air in the turbine air plenum before the second portion of the compressed air enters the combustor as fuel injector air and combustor secondary inlet air.

2. The gas turbine engine of claim 1, wherein the shaft cooling air pump comprises a plurality of screw threads positioned on the shaft in the cooling air flow path, wherein the screw threads are configured to compress the second portion of the compressed air flowing through the cooling air flow path.

3. The gas turbine engine of claim 2, wherein a pitch of the plurality of screw and a rotational speed of the shaft when in operation determines a flowrate of compressed air exiting the shaft cooling air pump.

4. The gas turbine engine of claim 2, wherein the plurality of screw threads engage with the outer combustor liner such that the outer combustor liner functions an outer shroud for the plurality of screw threads.

5. The gas turbine engine of claim 2, wherein the plurality of screw threads further comprise a shroud positioned on radially outboard tips of the screw threads and the shroud is configured to maintain a desired velocity for the compressed air flowing through the cooling air flow path.

6. The gas turbine engine of claim 2, wherein the plurality of screw threads comprise arched threads.

7. The gas turbine engine of claim 2, wherein the plurality of screw threads comprise straight threads.

8. The gas turbine engine of claim 2, wherein the screw threads are further configured to increase air velocity and pressure upstream of a fuel injector in the combustor to enhance injection of fuel into rich combustion zone in the combustor.

9. The gas turbine engine of claim 2, wherein the shaft cooling air pump further comprises a plurality of compression blades positioned on the turbine wheel in the cooling air flow path, wherein the plurality of compression blades are configured to compress the second portion of the compressed air flowing through the cooling air flow path and the gas turbine engine further comprises a plurality of turbine wheel deswirl vanes positioned in the cooling air flow path downstream of the plurality of compression blades positioned on the turbine wheel.

10. The gas turbine engine of claim 9, further comprising a shroud positioned on each of the plurality of hollow structs, wherein the shroud is configured to interact with the plurality of compression bladed positioned on the turbine wheel to compress the second portion of the compressed air flowing through the cooling air flow path.

11. The gas turbine engine of claim 2, wherein the shaft cooling air pump further comprises a scroll compressor positioned on the turbine wheel in the cooling air flow path, wherein the scroll compressor is configured to compress the second portion of the compressed air flowing through the cooling air flow path and the gas turbine engine further comprises a plurality of turbine wheel deswirl vanes positioned in the cooling air flow path downstream of the scroll compressor positioned on the turbine wheel.

12. The gas turbine engine of claim 1, wherein the shaft cooling air pump comprises a plurality of compression blades positioned on the turbine wheel in the cooling air flow path, wherein the plurality of compression blades are configured to compress the second portion of the compressed air flowing through the cooling air flow path and the gas turbine engine further comprises a plurality of turbine wheel deswirl vanes positioned in the cooling air flow path downstream of the plurality of compression blades positioned on the turbine wheel.

13. The gas turbine engine of claim 12, further comprising a shroud positioned on each of the plurality of hollow structs, wherein the shroud is configured to interact with the plurality of compression bladed positioned on the turbine wheel to compress the second portion of the compressed air flowing through the cooling air flow path.

14. The gas turbine engine of claim 1, wherein the shaft cooling air pump comprises a scroll compressor positioned on the turbine wheel in the cooling air flow path, wherein the scroll compressor is configured to compress the second portion of the compressed air flowing through the cooling air flow path and the gas turbine engine further comprises a plurality of turbine wheel deswirl vanes positioned in the cooling air flow path downstream of the scroll compressor positioned on the turbine wheel.

15. The gas turbine engine of claim 1, wherein the combustor further comprises:
  a toroidal recirculation zone configured to receive and combust fuel in a rich combustion zone;
  an ignitor positioned to ignite an air/fuel mixture in the rich combustion zone;
  a rapid quench zone downstream of the toroidal recirculation zone, wherein the rapid quench zone is configured to receive and quench with quench air combustion products from the rich combustion zone, wherein the rapid quench zone includes an array of quench tubes; and
  a lean combustion zone downstream of the rapid quench zone, wherein the lean combustion zone is configured to complete combustion of the fuel and to generate hot combustor exhaust gas.

16. A method of providing secondary compression for gas turbine engine combustor cooling air, comprising the steps of:
  providing suction, with a shaft cooling air pump, to pull a second portion of compressed air exiting a compressor through a plurality of hollow $1^{st}$ stage turbine vanes positioned between the combustor and the turbine, and into a turbine air plenum; and
  further compressing, with the shaft cooling air pump, the second portion of the compressed air in the turbine air plenum before the second portion of the compressed air enters a combustor as fuel injector air and combustor secondary inlet air.

17. The method of claim 16, wherein the shaft cooling air pump comprises a plurality of screw threads positioned on a shaft in the cooling air flow path, wherein the screw threads are configured to compress the second portion of the compressed air flowing through the cooling air flow path and wherein the shaft mechanically connects the turbine and the compressor, wherein the shaft is configured to transmit rotational energy from the turbine to the compressor to power the compressor, wherein the shaft connects the turbine to the compressor through an annulus formed by the combustor surrounding the shaft.

18. The method of claim 17, wherein the shaft cooling air pump further comprises a plurality of compression blades positioned on a turbine wheel in the cooling air flow path, wherein the plurality of compression blades are configured to compress the second portion of the compressed air flowing through the cooling air flow path and the gas turbine engine further comprises a plurality of turbine wheel deswirl vanes positioned in the cooling air flow path downstream of the plurality of compression blades positioned on the turbine wheel; or wherein the shaft cooling air pump comprises a scroll compressor positioned on the turbine wheel in the cooling air flow path, wherein the scroll compressor is configured to compress the second portion of the compressed air flowing through the cooling air flow path and the gas turbine engine further comprises a plurality of turbine wheel deswirl vanes positioned in the cooling air flow path downstream of the scroll compressor on the turbine wheel.

19. The method of claim 16, wherein the shaft cooling air pump comprises a plurality of compression blades positioned on a turbine wheel in the cooling air flow path, wherein the plurality of compression blades are configured to compress the second portion of the compressed air flowing through the cooling air flow path and the gas turbine engine further comprises a plurality of turbine wheel deswirl vanes positioned in the cooling air flow path downstream of the plurality of compression blades positioned on the turbine wheel.

20. The method of claim 16, wherein the shaft cooling air pump comprises a scroll compressor positioned on the turbine wheel in the cooling air flow path, wherein the scroll compressor is configured to compress the second portion of the compressed air flowing through the cooling air flow path and the gas turbine engine further comprises a plurality of turbine wheel deswirl vanes positioned in the cooling air flow path downstream of the scroll compressor on the turbine wheel.

* * * * *